April 30, 1963  O. BRUGGER ETAL  3,087,847
PROCESS AND APPARATUS FOR MANUFACTURING
SEAMLESS ENDLESS RUBBER TUBES
Filed Sept. 25, 1959  2 Sheets-Sheet 1
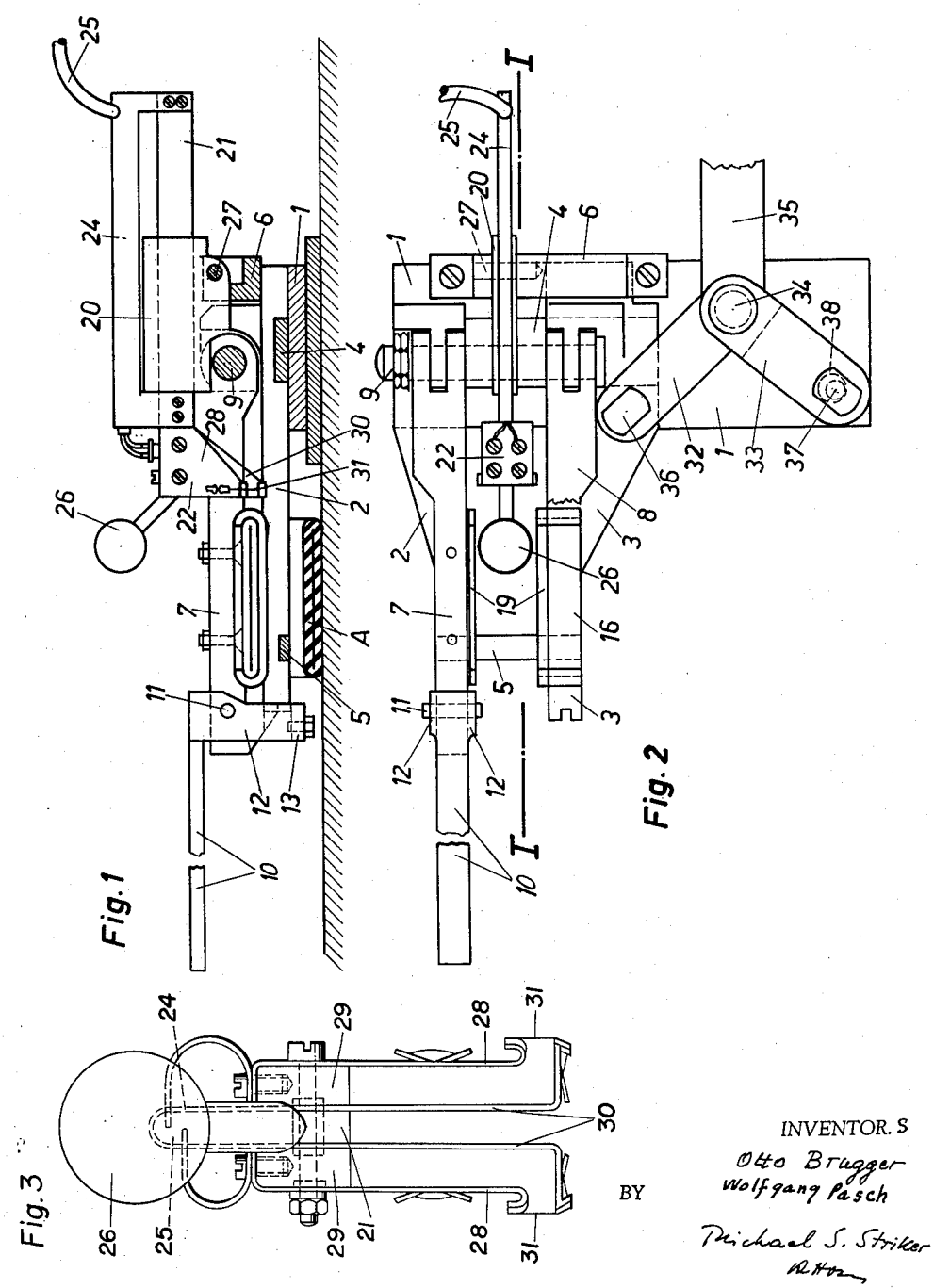
INVENTOR.S
Otto Brugger
Wolfgang Pasch
BY
Michael S. Striker

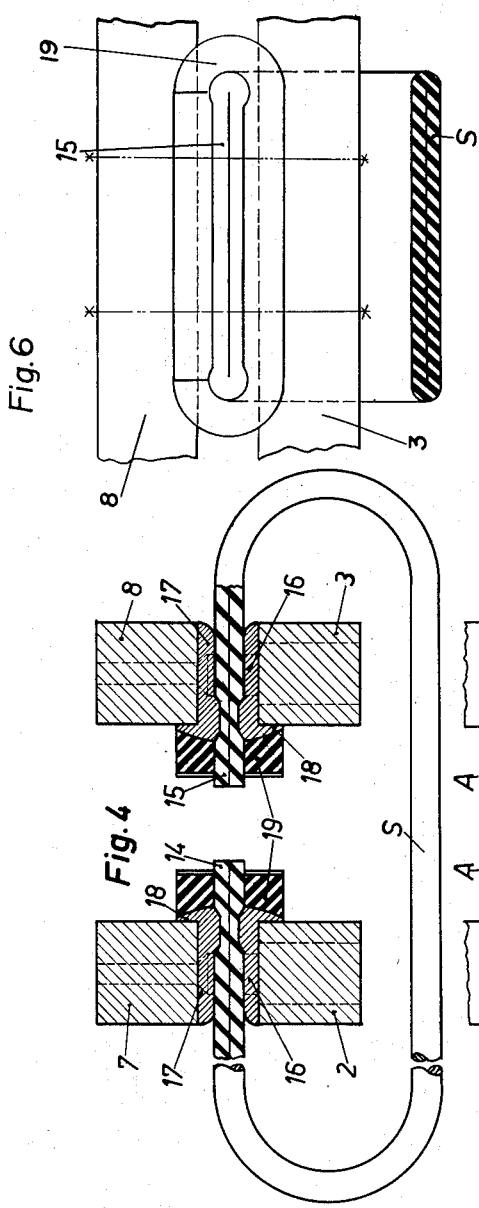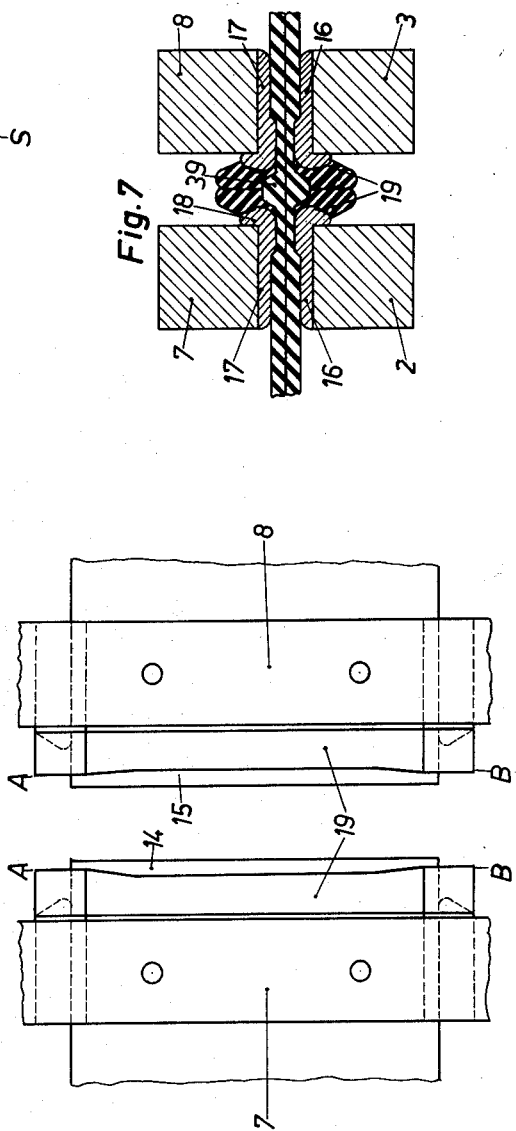

United States Patent Office 3,087,847
Patented Apr. 30, 1963

3,087,847
PROCESS AND APPARATUS FOR MANUFACTURING SEAMLESS ENDLESS RUBBER TUBES
Otto Brugger and Wolfgang Posch, Vienna, Austria, assignors to Semperit Osterreichisch-Amerikanische Gummiwerke Aktiengesellschaft, Vienna, Austria
Filed Sept. 25, 1959, Ser. No. 842,493
Claims priority, application Austria June 30, 1958
6 Claims. (Cl. 156—122)

The present invention relates to the manufacture of rubber tubular articles such as, for example, inner tubes for vehicle tires.

The present application is a continuation-in-part application of our copending application Ser. No. 824,044, filed June 30, 1959, and entitled "Process and Apparatus for Manufacturing Seamless Endless Rubber Tubes," now abandoned.

In the manufacture of articles of this type it is necessary to join together in a seamless and uniform fashion the ends of a pair of tubular rubber portions. Conventionally this is done by clamping the pair of tubular rubber portions while they are not yet fully vulcanized in a pair of clamps with the tubular rubber portions extending slightly beyond the clamps and then the clamps are moved toward each other so as to press the ends of the tubular rubber portions together so as to cause them to fuse. These clamps are made exclusively of metal and the portions of the tubular articles which are to be fused together which extend beyond the clamps are upset while being pressed together so as to form a seamless joint.

This conventional manner of joining together the ends of a pair of rubber tubular portions is not fully satisfactory since it has been possible in this conventional manner to provide a uniform joint. It has proved to be inevitable when joining together the ends of a pair of tubular portions in this conventional manner that there will be parts of the joint whose thickness is different from other parts of the joint.

One of the objects of the present invention is to provide a process and apparatus which will avoid the above drawbacks and will provide an absolutely uniform seamless joint between the ends of a pair of rubber tubular portions.

Another object of the present invention is to provide a process and apparatus which will guarantee uniform upsetting of the ends to be joined together all around the tubular portions.

A further object of the present invention is to provide an easily operable and relatively simple apparatus which will reliably cut the free ends of the tubular portions to be joined together in such a way that they conform to the configuration of the ends of the clamps which hold the tubular portions which are to be fused together.

An additional object of the present invention is to provide an apparatus capable of accomplishing the above objects and at the same time composed of simple ruggedly constructed parts which are very reliable in operation.

With the above objects in view the present invention includes in a process for fusing together the ends of a pair of tubular rubber portions which are not yet vulcanized together, the steps of clamping the pair of tubular rubber portions in a pair of clamps which respectively have rubber end portions directed toward each other and with the tubular portions extending slightly beyond the rubber end portions of the clamps toward each other, then cutting off the parts of the tubular portions extending beyond the rubber end portions of the clamps so that the tubular portions have end faces which form continuations of the end faces of the rubber end portions of the clamps, and then these clamps are pressed together with a force sufficient to form the rubber end portions of the clamps so as to press together the not yet vulcanized free end portions of the tubular articles to be joined together and thus cause them to fuse into each other to provide a seamless joint.

Also in accordance with the present invention there is provided an apparatus which includes the above clamps with the rubber end portions directed toward each other, and the rubber end portions of the clamps are provided with a slightly concave configuration from one side of the clamp to the other side of the clamp so that when the clamps are pressed together their opposite side edges will first engage each other before the rubber end portions are deformed so as to engage each other along their entire length and in this way a somewhat greater upsetting force will be provided at the opposite side edges of the clamps than along the portion between these opposite side edges, and the apparatus of the invention includes electrical resistance wires which are urged by springy supports along the end faces of the clamps so as to cut through the tubular portions to be fused together along paths which will coincide with the end faces of the clamps so as to very precisely shape the ends of the tubular portions before they are fused together.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 shows an apparatus according to the invention partly in section taken along line I—I of FIG. 2;

FIG. 2 is a top plan view of the structure with certain parts broken away and omitted for the sake of clarity;

FIG. 3 is a front end view on an enlarged scale of a cutting structure according to the invention;

FIGS. 4, 5 and 6 show in section, plan and side elevation clamping jaws of the invention with the tubular portions clamped therein, FIGS. 4–6 being approximately at full scale; and FIG. 7 is a sectional elevation showing the structure during the upsetting phase of the process.

Referring now to the drawings and FIGS. 1 and 2 in particular, it will be seen that the entire apparatus of the invention is mounted on a base plate 1 which is in turn fastened to a suitable worktable, for example. A horizontal carrier arm 2 is fixedly connected with the base plate 1 while a second carrier arm 3 is guided for movement toward and away from the arm 2 by guide rails 4 and 5 as well as a guide bar 6. The carrier arm 3 is at all times parallel to the carrier arm 2 and it will be seen that the rails 4 and 5 are fixedly carried by the base plate 1 and extend through transverse notches formed in the underside of the carrier arm 3, respectively. The guide bar 6, on the other hand, is carried by the base plate 1 with the guide bar 6 mounted on suitable blocks or the like so that there is between the top face of the base plate 1 and the bottom face of the guide bar 6 a space into which a free end of the carrier arm 3 extends, so that in this way the guide bar 6 cooperates with the base plate 1 to also participate in the guiding of the carrier arm 3 toward and away from the carrier arm 2.

A pair of clamping arms 7 and 8 are respectively located over the carrier arms 2 and 3 and are pivotally connected thereto by a pivot pin 9 which is common to both of the clamping arms 7 and 8 which are respectively located over the carrier arms 2 and 3 for turning movement around the axis of the horizontal pivot pin 9 downwardly toward and outwardly away from the carrier arms 2 and 3, respectively. The base plate 1 has fixedly connected thereto a pair of ears which respectively extend between the bifurcated ends at the right of the clamp arms 7 and 8, as viewed in FIG. 2, and these ears are formed with openings aligned with those formed in the bifurcated ends of the arms 7 and 8 so that in this way the pivot pin 9 is supported and at the same time connects the arms 7 and 8 to the base plate 1 for turning movement toward and away from the arms 2 and 3, respectively.

As is shown in FIGS. 1 and 2, there is pivotally connected to the left free end of the clamping arms 7, as viewed in FIGS. 1 and 2, by a pivot pin 11 a lever 10 which has a relatively short range of turning movement, and this lever 10 has at its right end, as viewed in FIGS. 1 and 2, a pair of downwardly directed plate portions 12 respectively formed with openings which receive the pivot pin 11, the latter also extending through the arm 7, and these plate portions 12 extend downwardly to an elevation lower than the carrier arm 2. At their lower end portions the plate portions 12 are fixedly connected with a cross bar 13 which extends across the space between the plates 12, and with this arrangement it is possible when the clamp arm 7 is located in close proximity to the carrier arm 2 to turn the lever 10 in a counterclockwise direction, as viewed in FIG. 1, so as to place the cross bar 13 beneath the arm 2 and thus lock the arm 7 to the arm 2 in a clamping position, and the arm 7 is unlocked simply by turning the lever 10 through a relatively short distance in a clockwise direction, as viewed in FIG. 1. An identical lever 10 with plate portions 12 and cross bar 13 are pivotally connected in exactly the same manner to the arm 8 so that the arm 8 can be releasably locked to the carrier arm 3 in the same way.

Between the carrier arms 2 and 3 and the clamping arms 7 and 8, respectively, are arranged the clamps of the present invention, these clamps being shown most clearly in FIGS. 4–6. The clamps of the invention clamp the rubber tubular portions 14 and 15 of a tube S in the illustrated example for the purpose of fusing the ends of the tubular portions 14 and 15 together in a manner described below. The clamps of the invention are so constructed that they embrace each tubular portion around the entire circumference thereof and prevent any undesirable pressure at the side edges of the tubular portions. Inasmuch as both of the clamps of the invention are identical, only one of the clamps is described in detail below.

Each clamp consists of a metallic lower part 16 as well as a metallic upper part 17. The lower part 16 of one clamp is removably fixed in any suitable way to the carrier arm 2 while the lower part 16 of the other clamp is removably fixed in any suitable way to the other carrier arm 3, and each of the lower clamp parts 16 is provided with substantially semi-circular end portions which extend around the curved side edges of the flattened tubular portion 14 or 15. The upper part 17 of one clamp is removably fixed to the clamping arm 7 while the other upper part 17 of the other clamp is removably fixed to the clamping arm 8, and each clamping element 17 fills the space between the upper free ends of the clamping element 16 so that the clamping elements 16 and 17 together form a closed space in which the tubular portion 14 or 15 is clamped around its entire circumference. Both of the clamping elements 16 and 17 are provided at one end with a flange 18 (FIG. 4), and it will be noted that the flange 18 of the elements 16 and 17 is located at the ends of these elements which are directed toward the other clamp so that the flanges 18 are directed toward each other as shown in FIG. 4. In accordance with the present invention each clamping element 16 and 17 has fixed thereto at the exterior surface of its flange 18 a rubber clamping portion 19, and the clamping portions 19 are longitudinally of the same configuration as the clamping elements 16 and 17. Thus, one of the clamping portions 19, which is to say the one fixed to the element 16, has semi-circular free ends and between these free ends extends the other clamping element 19 which is of the same length and fixed to the other clamping element 17 as indicated in FIGS. 4–6. The rubber portions 19 of the clamps are joined to the metal portions 16 and 17 thereof permanently in a well known manner of vulcanizing rubber to metal. Thus, it will be noted that the clamps of the invention are not constructed exclusively of metal but instead of the rubber portions 19 directed toward each other. Thus, the tubular rubber portions which are to be fused together at their ends will be tightly gripped by the metal clamping portions 16 and 17 and will also be gripped by the rubber portions 19 but the latter will grip the articles with a lesser force than the metallic portions 16 and 17.

Also in accordance with the present invention the end faces of the clamps which are directed toward each other are provided with special contour so as to provide a uniform upsetting of the tubular articles to be fused together along their entire circumference. Thus, as is shown most clearly in FIG. 5, the right end face of the portion 19 of the left clamp of FIG. 5 and the left end face of the portion 19 of the right clamp of FIG. 5 are not flat. These end faces extend along the contours A—B and are slightly concave. Thus, from one side to the other side of each clamp the free end face of the rubber portion 19 thereof is slightly concave and as a result when the pair of clamps are moved toward each other the portions 19 will first engage each other at their opposite sides and then the portions 19 of both clamps will engage each other along their entire length, so that as a result there is a greater compression of the elements 19 at their opposite sides than along the longitudinal intermediate portions thereof and in this way a somewhat greater upsetting force is provided at the curved side edges of the flattened tubular rubber portions which are to be joined together and inasmuch as the area of the ends to be fused together is greater at these curved side edges it is clear that uniform upsetting along the entire circumference is obtained in this manner.

When the tubular rubber portions 14 and 15 are first placed in the clamps they extend somewhat beyond the end faces of the rubber portions 19 of the clamps, as indicated most clearly in FIGS. 4 and 5. Thereafter the tubular portions are cut in a manner described below along the end faces of the clamps so that the end faces of the tubular portions 14 and 15 which are directed toward each other form continuations of the end faces of the rubber clamping portions 19.

The clamps are designed for a tube of particular dimensions. Thus, where an inner tube such as the tube S is being manufactured, a particular set of clamps will be used according to the diameter of the inner tube. When an inner tube of a different diameter is to be manufactured, then the clamps are removed from the arms 2, 3, 7 and 8 and replaced by different clamps of a suitable size.

The structure for cutting off those portions of the tubes 14 and 15 which extend beyond the clamping portions 19 is made in a special way according to the present invention. This cutting structure is shown in FIGS. 1–3. As is apparent from FIGS. 1 and 2, there is located over the guide bar 6 on a pivot pin 27 which is carried by the guide bar 6 a grooved slide block 20 formed with an elongated groove extending parallel to the arms 2 and 3. A bar 21 is axially slidable in the groove of the guide block 20, and a substantially U-shaped member 24 is fixed at its opposite ends to the bar 21 in the manner shown most clearly in FIG. 1. It will be noted that the downwardly directed ends of the element 24 are located at the elevation of the guide block 20 so that these downwardly directed ends of the element 24 limit the axial sliding of the bar 21 in both directions by engagement between these downwardly directed free ends of the element 24 with the ends of the guide block 20. In the position of the part shown in FIG. 1 the left downwardly directed free end portion of element 24 engages the left end face of the guide block 20 so as to prevent further movement of the bar 21 to the right, as viewed in FIG. 1.

A cutting head 22 constructed according to the present invention is fixed by suitable screw members to the front end of the bar 21, this front end extending to the left beyond the element 24, as viewed in FIG. 1 and the cutting head 22 is fixed to this portion of the bar 21 which extends beyond the element 24. The element 24 serves to hold an electrical conductor 25 connected with any suitable source of electricity for a purpose described below. The cutting head 22 has fixedly connected thereto a handle 26 which is engaged by the operator for moving the cutting device back and forth. Of course, the entire cutting structure is turnable about a bolt or pivot pin 27.

The cutting head 22 which is shown most clearly in FIG. 3 includes on both sides a pair of outer springy sheet metal plates 28, and these plates 28 are fixedly carried by insulating blocks 29 of electrically non-conductive material, these insulating blocks 29 themselves being fixed to the bar 21. In addition the cutting head includes a pair of inner springy sheet metal plates 30 which are fixed directly to the bar 21 at opposite side faces thereof and thus these inner springy plates 30 are electrically grounded. It will be noted that the blocks 29 are located between the elements 30 and the outer springy plates 28. The outer side edges of each pair of springy plates 28 and 30 converge toward the outer side edges of the other pair of springy plates 28 and 30 at each end of the pairs of springy plates so that the cutting head 22 will slide easily into the space between the end faces of the portions 19 of both clamps. When the structure is in a rest position illustrated in FIG. 2 there is a predetermined space between the clamps and the width of the cutting head 22 from the outer side edges of one set of plates 28 and 30 to the outer side edges of the other pair of plates 28 and 30 is carefully chosen so that as the cutting head 22 is moved back and forth along the space between the clamping members the side edges of the pairs of plates 28 and 30 will engage the end faces of the elements 19 with a light force while sliding along these end faces, and the springy plates 28 and 30 will expand outwardly so as to engage the elements 19 along their entire length even though these elements 19 are slightly concave from one side edge to the other, as pointed out above.

The actual cutting is done by a resistance wire 31 which bridges the gap between the side edges of each pair of springy plates 28 and 30, as illustrated in FIG. 3. The electrical circuit extends through the resistance wires 31 which are heated by manual closing of a switch and these elements 31 will slide along the exterior faces of elements 19 due to the resilient supporting structure 28, 30 and as a result those portions of the tubular rubber parts 14 and 15 which extend beyond the parts 19 of the clamps will be cut off along the end faces of the parts 19 so that with this cutting structure of the invention in a simple and convenient manner it is possible to move the cutting device through the space between the clamps and provide automatically a cutting of the tubular portions to be joined to each other in such a way that the end faces of the latter coincide with the end faces of the elements 19. The cutting with electrical resistance wires in this manner is of particular advantage since the cut is smooth and clean and there is no possibility of including even the smallest air bubbles in the material of the tubular elements which are to be fused together.

It is also important that the pressure with which the clamps are pressed together be of a certain relatively large magnitude and extend over a certain period of time in order to provide a high quality joint where the ends are fused together, and the upsetting process itself should go forward at a relatively slow rate. The movable carrier 3 with all of the clamping structure carried thereby is moved toward and away from the stationary carrier 2 and the structure carried by the latter by a toggle joint linkage illustrated in FIG. 2. This toggle joint linkage includes the pair of levers 32 and 33 which are pivotally connected to each other at 34 and an actuating rod 35 is also connected to the pivot 34 so that when the rod 35 is axially moved the toggle joint is actuated to move the carrier arm 3 and all of the structure carried thereby in one direction or the other along the guide rails 4 and 5 toward or away from the stationary carrier arm 2. A suitable compressed air cylinder may have a piston therein connected to the rod 35 for moving the latter and applying the necessary force. A pivot 36 pivotally connects the arm 32 of the toggle joint to the movable carrier arm 3, while a pivot 37 pivotally connects the arm 33 to the base plate 1. Preferably the base plate 1 carries a bearing 38 in which the pivot 37 is turnable, and this bearing 38 is provided with an off-center bore through which the shank of the pivot pin 37 turnably extends and the bearing 38 is itself adjustable about its axis so that as a result of this eccentric mounting of the pivot pin 37 it is possible to adjust the distance of the pivot pin 37 from the bar or carrier arm 3. Thus, with this adjustment it is possible to very accurately regulate the upsetting stroke. The compressed air cylinder which acts on the rod 35 so as to cause the toggle joint to move the carrier arm 3 toward the carrier arm 2 provides a very desirable operation in that the carrier arm 3 will be moved very quickly toward the carrier arm 2 until the rubber portion 19 of the clamp carried by the arm 3 engages the rubber portion 19 of the clamp carried by the arm 2, and then during the upsetting and during the deformation of the rubber portions 19 the movement of the arm 3 toward the arm 2 takes place at a much slower rate so that a very efficient and effective flowing of the still unvulcanized material at the ends of the tubular portions 14 and 15 into each other takes place.

A cycle of operation of the above-described structure will now be described:

The movable carrier arm 3 is located in its rest position distant from the stationary arm 2, as illustrated in FIG. 2. The clamping arms 7 and 8 as well as the upper clamping elements 17 respectively carried thereby are turned upwardly away from the arms 2 and 3, and of course the levers 10 are located with the arms 7 and 8 away from the arms 2 and 3. At this time one end 14 of the inner tube which has already been provided with a valve is placed in the lower portion 16 of the clamp carried by the arm 2 and then the arm 7 is turned downwardly and locked to the arm 2 so that the end 14 of the inner tube S is now clamped. The lever 10 is turned so as to locate the cross bar 13 beneath the arm 2 and thus lock the clamping arm 7 to the arm 2. In the same way the other end 15 of the tubular member S is located in the clamp carried by the arms 3 and 8. These portions 14 and 15 which are to be fused together extend slightly beyond the end faces of the rubber portions 19 of the clamps, and at this time the cutting device is brought into play by being turned downwardly to the operating position. The cutting head 22 is moved by manual manipulation of the handle 26 between the elements 19 of the clamps and the heated wire 31 will cut off those portions of the parts 14 and 15 which extend beyond the elements 19. The resistance wires 31 are energized so that they will be heated only just before the cutting action starts and during the cutting action and immediately after the cutting is completed the circuit is opened by manipulation of a suitable switch so that the supply of energy to the resistance wires 31 terminates.

Any suitable electrical adjusting structure is provided for regulating the temperature of the wires 31 in accordance with the particular speed of movement of the cutting head. Thus, with this construction the free portions of parts 14 and 15 are cut off and these parts 14 and 15 are provided with end faces which are flush with the end faces of the rubber portions 19 of the clamps. Inasmuch as the distance between the end faces of the clamps at the portions 19 thereof is always the same, the same conditions will be repeated at each cycle of operation. After the cutting has been completed the cutting device is turned to an inoperative position where it is out of the way. Thus, the entire cutting device can be turned around the bolt 27 so as to be located out of the way when not in use.

Now a valve which controls the above-mentioned compressed air cylinder is manipulated so that the piston in the compressed air cylinder acts through the rod 35 connected thereto on the toggle joint to expand the latter and thus move the carrier arm 3 in all of the structure carried thereby toward the carrier arm 2 so that the end faces of the rubber portions 19 of the clamps of the invention engage each other and of course the end faces of the tubular portions 14 and 15 will also be pressed together. Inasmuch as the initial contact of the tubular portions 14 and 15 takes place at their curved side edges, as pointed out above, then when the entire end faces of the parts 14 and 15 engage each other the upsetting process will have already been underway at the curved side edges of the rubber portions 14 and 15 which are not yet vulcanized. Thus, during the further movement of the arm 3 toward the arm 2 which takes place at a slower rate because of the greater resistance to such movement the end faces of the tubular portions 14 and 15 are pressed together and form an enlarged bead 39 illustrated in FIG. 7, and the thickness of the tubular portions at this bead is of course larger than the wall thickness of the remainder of the tubular portions 14 and 15. This phase of the process is illustrated in FIG. 7, and it will be noted that the force with which the arm 3 is pushed toward the arm 2 is sufficient to deform the rubber portions 19 of the clamps considerably. These rubber portions 19 are uniformly deformed and because of the formation of the bead 39 these rubber elements 19 cannot be deformed inwardly toward each other and are compelled to yield only in an outward direction. They thus provide on the bead 39 a certain inwardly directed compressive force acting in a direction perpendicular to the direction of movement of the arm 3 toward the arm 2, which is to say perpendicularly to the upsetting force, and in this way the homogeneous fusing of the ends of the tubular parts 14 and 15 is greatly enhanced. It has been found that a rubber mixture having a Shore hardness of 45–50° is most suitable for the rubber elements 19. After a predetermined length of time the levers 10 are unlocked from the arms 2 and 3 so as to release the clamping arms 7 and 8 and the latter are turned upwardly away from the arms 2 and 3 so that the now united tubular portions 14 and 15 can be removed from the lower clamping elements 16 and the portions 19 fixed thereto. Now the compressed air cylinder is actuated by suitable manipulation of the valve referred to above so as to return the bar 35 and thus the toggle joint to its rest position and in this way the carrier arm 3 is moved away from the carrier arm 2 so as to again locate the clamps in their rest position with respect to each other. In the case of an inner tube as illustrated, this tube is placed in a known way in a suitable form and is vulcanized with an excess of inner pressure so that the material of the bead 39 flows into the adjoining material of the wall of the inner tube and all evidence of any seam is completely eliminated and the structure is unitary and uniform and is the same as if the entire endless closed tube were formed in one piece without ever having any free ends to be joined together.

Of course the process and apparatus of the invention can be used for joining together tubular rubber portions other than those found at the ends of an inner tube during the manufacture of the latter. All that is required is clamps provided with the rubber portions of the invention, and these rubber portions of the clamps need only be provided with a suitable profile. Also, without departing from the principle of the invention it is possible to incorporate known devices into the above-described structure for carrying through all of the operations automatically, with the exception of placing the work into the machine and removing it from the machine.

It will be understood that each of the elements described above, or two or more together, may also find a useful application in other types of process and apparatus for treating rubber articles differing from the types described above.

While the invention has been illustrated and described as embodied in process and apparatus for fusing together a pair of tubular portions made of unvulcanized rubber, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for seamlessly joining together the ends of a pair of tubular portions of rubber, the steps of clamping the pair of tubular portions in flattened condition in a pair of clamps so that each tubular rubber portion has a pair of flat layers joined by curved parts at the side edges thereof, said clamps being respectively provided with rubber end portions having respectively concavely curved end faces facing each other and the distances between surface portions of said facing end faces adjacent said curved parts of said tubular portion being smaller than the distances between surface portions of said facing end faces adjacent said flat layers and with the tubular portions which are to be joined together extending beyond the rubber end portions of the clamps toward each other; cutting from the tubular portions all parts thereof which extend beyond the rubber end portions of the clamps so that the tubular portions will have end faces respectively extending along and flush with said concavely curved end faces of said rubber end portions of said clamps; and pushing the clamps together with a force sufficient to deform the rubber end portions thereof so as to press together the tubular rubber portions whereby the latter, which are pushed together while still not fully vulcanized, will become fused to each other to form a seamless joint.

2. In a process for seamlessly fusing together the ends of a pair of tubular rubber portions which are not yet vulcanized, the steps of clamping the tubular rubber portions in flattened condition so that each tubular rubber portion has a pair of layers joined together by curved parts of the tubular rubber portion at the side edges thereof; cutting across the tubular rubber portions adjacent to the free ends thereof which are to be fused together along a curved line crossing the flattened tubular rubber portions along an arc whose concavity is endwise and which locates the tubular rubber portions with the curved parts of one tubular rubber portion located closer to the curved parts of the other tubular rubber portion, respectively, than the flat layers extending between the curved parts; and pressing the ends of the thus-cut tubular portions together so that the curved parts engage each other in advance of and with a pressure greater than the flat parts of the tubular rubber portions.

3. In an apparatus for seamlessly fusing the ends of a pair of tubular rubber portions which are not yet vulcanized, a pair of clamps for respectively clamping the pair of tubular rubber portions in flattened condition, said clamps respectively having metal clamping portions and rubber clamping portions respectively joined to the metal clamping portions and the rubber clamping portions of the clamps being directed toward each other and located nearer to each other between the metal clamping portions of the clamps; each of said clamping portions having an elongated free end face having a concave curvature extending from one to the other end of the elongated end face and the distance between the ends of one end face and the ends of the other end face which are respectively directed toward said ends of said one end face being less than the distance between end face portions intermediate said ends and which are directed toward each other; means supporting said clamps in alignment and at a predetermined distance from each other prior to movement of the clamps toward each other for pressing together the ends of the tubular portions which are to be fused; springy means movable between and along said rubber clamping portions while the clamps are spaced from each other; and electrical resistance wires carried by said springy means and urged thereby against said rubber portions of said clamps during movement of said springy means along said rubber portions of said clamps for cutting off parts of the tubular portions which extend beyond said rubber portions of said clamps to provide, before the tubular portions are pressed together, end faces of the tubular portions which form continuations of and are flush with the end faces of the rubber portions of the clamps, said springy means maintaining said wires respectively in engagement with said rubber portions of said clamps irrespective of variations in the contour thereof so that the end faces of said tubular portions will necessarily conform to the contour of said rubber portions of said clamps.

4. In an apparatus for fusing together the ends of a pair of rubber tubular portions which are not yet vulcanized, in combination, a pair of aligned clamps for clamping the tubular portions in flattened condition, each clamp having a metallic clamping portion and a rubber clamping portion joined to the metallic clamping portion and the rubber clamping portions of the pair of clamps being directed toward each other and located between the pair of metallic clamping portions and each rubber clamping portion having an elongated free end face which has a concave curvature extending from one end to the other end of the elongated rubber clamping portion and the distance between the ends of one rubber clamping portion and the ends of the other rubber clamping portion which are respectively directed toward said ends of said one rubber clamping portion being less than the distance between end face sections of said rubber clamping portions which are intermediate said ends thereof and which are directed toward each other, so that when the clamps are moved into engagement with each other the pair of rubber clamping portions will first engage each other at their ends and then will engage each other along their entire length only upon further movement of the clamps toward each other during deformation of the rubber clamping portions.

5. In an apparatus for fusing together the not yet vulcanized ends of a pair of tubular rubber portions, in combination, a pair of aligned clamps one of which is adapted to be moved toward the other for pressing together the ends of a pair of tubular portions held by said clamps, each of said clamps having an elongated free end face having a concave curvature extending from one to the other end of the elongated end face and the distance between the ends of one end face and the ends of the other end face which are respectively directed toward said ends of said one end face being less than the distance between end face portions of said clamps intermediate said ends and which are directed toward each other; means supporting said clamps in spaced relation prior to movement of said one clamp toward the other; moving means movable along a straight path extending along the space between the clamps; a pair of springy means carried by said moving means and respectively having free end portions which extend into the space between the clamps and ride along and yieldably press against the end faces thereof which are directed toward each other, each springy means having a pair of spaced edge portions; and an electric resistance wire carried by each springy means and extending across the space between said edge portions thereof so that the electric resistance wires will also ride along the end faces of the clamps which are directed toward each other and will cut off any portions of the tubular articles to be fused together which extend toward each other beyond the end faces of the clamps, said pair of springy means respectively maintaining said wires in engagement with said longitudinally concave end faces of said clamps during movement of said moving means and said pair of springy means therewith along said straight path as a result of the yieldability of said pair of springy means.

6. A process as defined in claim 1 in which cutting of all parts from the tubular portions which extend beyond the rubber end portions of the clamps is carried out by moving heated electrical resistance wires along the end faces of the rubber end portions of the clamps so as to cut the tubular rubber portions flush with the end faces of the rubber end portions of the clamps.

References Cited in the file of this patent

UNITED STATES PATENTS

| | | |
|---|---|---|
| 2,145,607 | Nichols | Jan. 31, 1939 |
| 2,534,252 | Engler | Dec. 19, 1950 |
| 2,647,555 | Hinman | Aug. 4, 1953 |
| 2,773,541 | Mulbarger | Dec. 11, 1956 |

FOREIGN PATENTS

| | | |
|---|---|---|
| 418,763 | Great Britain | Oct. 31, 1934 |
| 528,539 | Great Britain | Oct. 31, 1940 |